No. 704,921. Patented July 15, 1902.
W. R. POWELL.
FILTER.
(Application filed Nov. 27, 1901.)
(No Model.) 2 Sheets—Sheet 1.
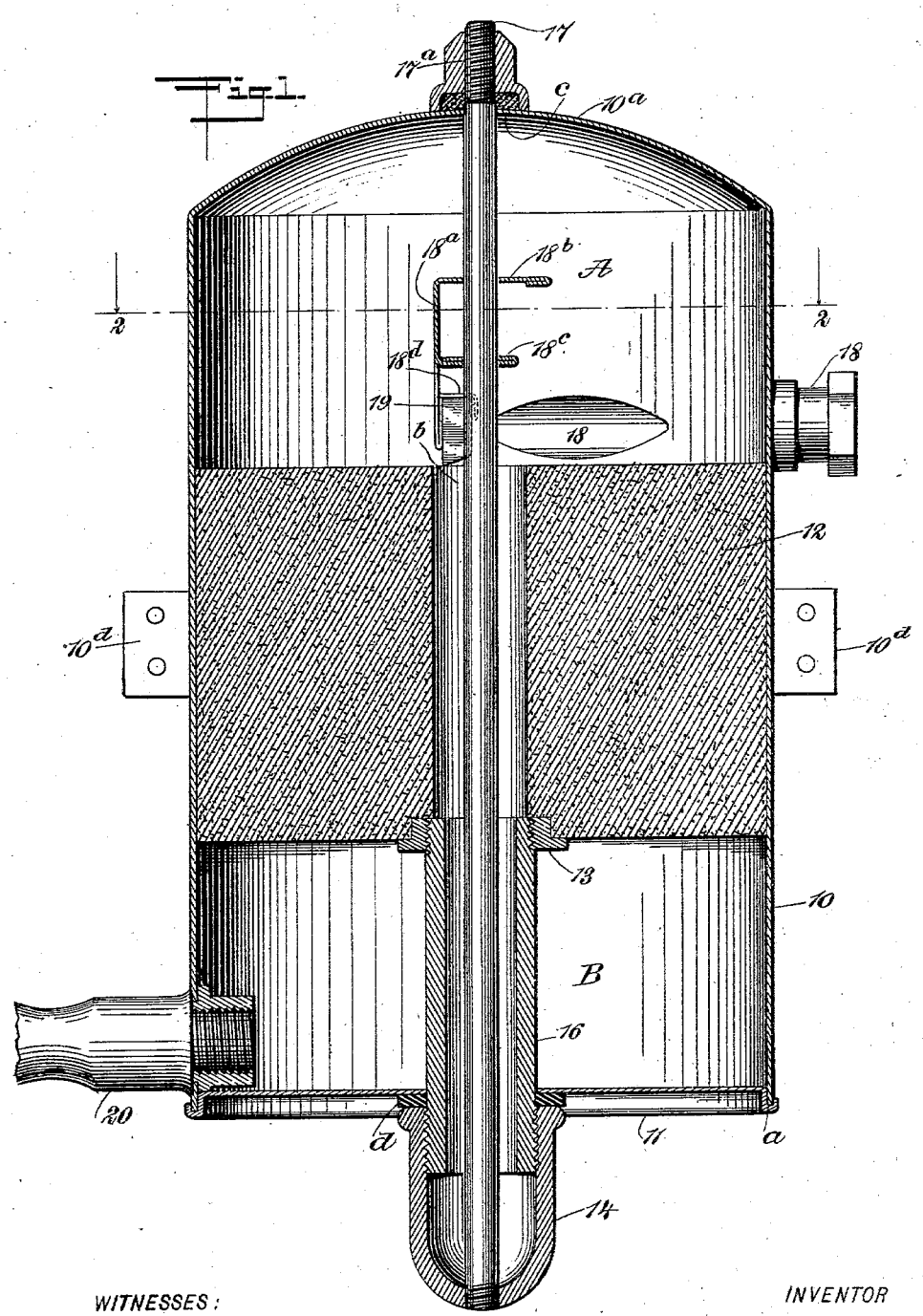
WITNESSES:
INVENTOR
William R. Powell
BY
ATTORNEYS

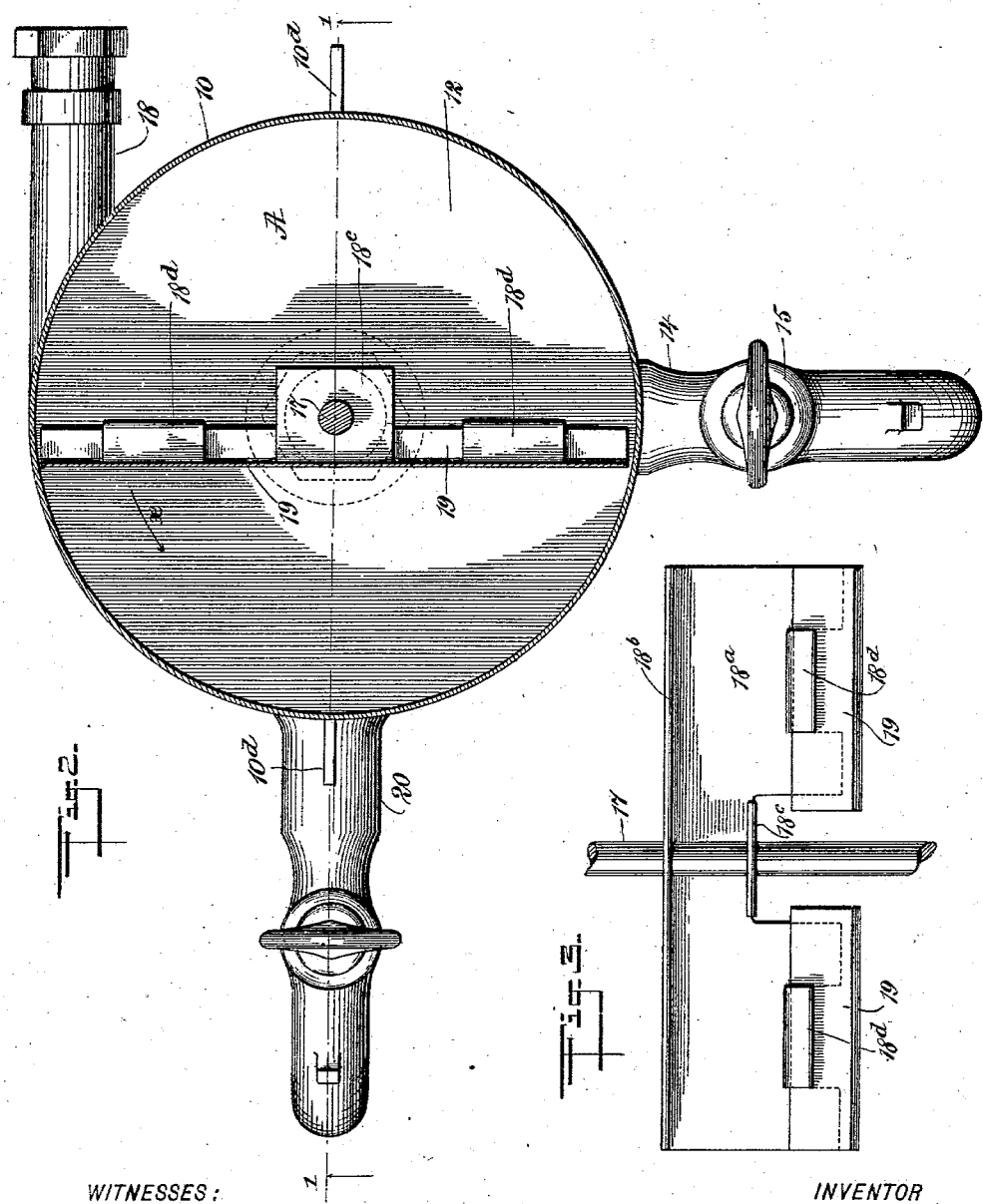

UNITED STATES PATENT OFFICE.

WILLIAM R. POWELL, OF WHEELING, WEST VIRGINIA, ASSIGNOR OF ONE-HALF TO CHARLES WOOD, OF WHEELING, WEST VIRGINIA.

FILTER.

SPECIFICATION forming part of Letters Patent No. 704,921, dated July 15, 1902.

Application filed November 27, 1901. Serial No. 83,842. (No model.)

*To all whom it may concern:*

Be it known that I, WILLIAM R. POWELL, a citizen of the United States, and a resident of Wheeling, in the county of Ohio and State of West Virginia, have invented new and useful Improvements in Filters, of which the following is a full, clear, and exact description.

The invention relates to a class of filters in which a natural or artificial porous block is employed as a filtering medium, and has for its object to provide novel details of construction for a device of the indicated character which adapt the improved filter for efficient service and afford means for a periodic cleansing of the filtering medium automatically and thoroughly as occasion may require.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a sectional side view of the improved filter substantially on the line 1 1 in Fig. 2. Fig. 2 is a sectional plan view substantially on the line 2 2 in Fig. 1, and Fig. 3 is an enlarged side view of a scraper employed.

The improved filter may be used for the separation of sedimentary impurities from liquids of different kinds, and as a water-filter may be of large or small dimensions to suit the requirements of the service to be rendered by the filtering device.

The filter shown in the drawings to illustrate the construction and application of the invention is best adapted for filtering water for household use or the filtering in moderate quantity of water to render it potable and is constructed as follows:

The casing 10, which is the main receptacle of the filtering device, is preferably cylindrical and provided with an integral top wall $10^a$, that is dome-shaped, as shown in Fig. 1, and said casing may with advantage be manufactured of seamless steel and protected by enamel. The bottom wall 11 consists of a flat disk of plate metal, having a U-shaped channel $a$ formed on its circular edge, the lower true edge of the casing 10 having an air-tight seat in the channel $a$.

A cylindrical porous block 12 is fitted water-tight within the casing 10 and secured at a suitable point between the ends of the casing, and for efficiency in service the block should have considerable thickness proportioned to the length of the casing, so that a water-receiving chamber A of proper dimensions is provided above the filtering-block and a filtered-water receptacle B below the block. A central passage $b$ is formed in the porous block 12, and in the lower counterbored end of said passage a flanged nut 13 is secured in the counterbore having its threaded orifice disposed as an extension of the passage $b$.

An outlet-pipe 14, having a spigot 15 therein (see Fig. 2) for opening and closing it, is held over a central aperture in the bottom wall 11 by the threaded engagement of an upturned end of the pipe 14 with the lower end of a nipple-tube 16, which extends upward through the water-chamber B and screws at its upper end into the nut 13. A center shaft 17 is secured at the lower end in the upward bend of the outlet-pipe 14, and thence extends up through the nipple-tube 16, porous block 12, and upper wall $10^a$ of the casing 10 and has a thread on its extension upper end engaged by a nut $17^a$, which screws down upon a joint-ring $c$, placed between the nut and the wall $10^a$, as clearly shown in Fig. 1.

It will be seen that the shaft 17 serves as a clamping-bolt for securing the bottom wall 11 upon the casing 10 and also holds the outlet-pipe 14 in enforced engagement with the joint-ring $d$, which is mounted upon the lower end of the nipple-tube 16 and seats upon the lower side of the bottom wall 11 adjacent to the tube.

An inlet for liquid, such as water which is to be filtered, extends from a source of water-supply under pressure and enters the casing 10 above the porous block 12, said supply-pipe 18 tapping the casing near the upper surface of the porous block and being disposed tangentially to the wall of the casing, as best shown in Fig. 2.

Upon the portion of the shaft 17 that passes through the receiving-chamber A a scraper device is loosely mounted and consists, essentially, of a preferably rectangular plate-metal body 18ª, having scrapers 19 held in position for service on its lower edge. A top flange 18ᵇ is laterally projected from the upper portion of the body-plate 18ª, and at the longitudinal center of said body-plate a complementary flange 18ᶜ is formed or secured thereon, as is clearly represented in Figs. 1 and 3. The flange 18ᶜ is preferably formed integral with the body-plate 18ª, and consists of a portion of said body-plate partially released by cutting two parallel-spaced slits from the lower edge of the body-plate at points equally distant from the ends of the same. The material between the slits mentioned is folded upon itself. Then the thickened flange 18ᶜ is bent upward, so as to dispose it parallel with the top flange 18ᵇ, and the latter in order to afford weight to the body-plate may with advantage extend the entire length thereof. At the longitudinal center of the scraper-body 18ª alined perforations are formed in the flanges 18ᵇ 18ᶜ, of a suitable diameter for the reception of the shaft 17, which disposes the scraper-body transversely of the chamber A, and said body has clearance at its ends from the side wall of the casing 10. The lower portions of the scraper-body 18ª, at each side of the flange 18ᶜ, each have a clamping-flange 18ᵈ formed thereon near the lower end thereof, and said clamping-flanges are adapted to hold the two similar scraper-blades 19 in place projecting from the lower edge of the body portion 18ª. The scraper-blades 19 may with advantage be formed of abrasive material, such as strips of consolidated corundum or the like, which will bite on the upper surface of the porous block 12 and scrape it clean when the body 18ª and the scrapers 19 are together rotated.

A spigot 20 is affixed to the wall of the casing 10, near its lower edge, and taps the chamber B, as shown in Fig. 1, for drawing from said chamber the water that has been filtered.

It will be seen that when the spigot 15 is closed water which enters the upper chamber A through the supply-pipe 18, which is to be controlled by a valve (not shown) in said pipe, will permeate the porous block 12 and be mechanically purified, the sediment being deposited upon the upper surface of the porous block. At the proper intervals of time the accumulated impurities may be removed from the upper surface of the porous block 12 by opening the waste-spigot 15, which will permit a flow of water down through the central passage b, nipple-tube 16, and said spigot, which will continue while the inlet-cock and discharge-spigot are in opened condition. The inflowing jet of water from the inlet-pipe 14 will strike the scraper-body 18ª near its ends, successively impinging each scraper-blade 19 on an adjacent side of the block 12. As the relative position of the inlet-pipe 14 adapts the water forced therefrom against the end portions of the scraper-body to impinge thereon at or near a right angle thereto, it will be apparent that the force of the water-jet will rapidly rotate the scraper device in direction of the arrow $x$ in Fig. 2, and thus cause the scraper to release impurities from the filtering medium. This sedimentary deposit being mixed with the swirling current is carried therewith away through the spigot 15 to a point of discharge.

It will be seen that the cleansing operation is automatic and may be continued until the filtering-block 12 is thoroughly cleaned on its top surface, the abrasion of the scrapers 19 serving to cut away glazing of hard deposit, that tends to stop up the pores of the block.

The casing 10 may be secured at a desired point above a sink-basin or other receptacle for waste water by the attachment of the ears 10ᵈ on the casing to a stable support, whereby the filter will be maintained upright and in position for service as required.

Having thus fully described my invention, I claim as new and desire to secure by Letters Patent—

1. In a filter, the combination, with a cylindrical casing, a securable bottom wall on the casing, and a waste-water spigot, of a porous filtering-block secured in the casing between its ends and having a central passage therethrough, a liquid-inlet above the block, a nipple-tube extended from the lower end of the central passage in the porous block and adapted to communicate with the waste-water spigot, a spigot for drawing filtered liquid from the lower portion of the casing, and a scraper device adapted for rotation in contact with the upper surface of the porous block, when a current of liquid passes through the casing.

2. In a filter, the combination, with a cylindrical casing, a removable bottom wall therefor, and a waste-liquid discharge-spigot, of a porous filtering-block secured in the casing between its ends and having a central passage therethrough, a nipple-tube extended from said central passage down through the bottom wall of the casing, a center shaft secured at its lower end to the waste-liquid discharge-spigot and at its upper end upon the top wall of the casing, a scraper device loosely mounted upon the shaft and contacting with the upper end of the porous block, a liquid-inlet pipe tapping the side of the casing and extended tangentially therefrom so as to direct a liquid-jet upon the ends of the scraper device for its rotation, and a spigot for drawing liquid from the lower portion of the casing.

3. In a filter of the character described, the scraper device, comprising a plate-metal body having two spaced flanges projected at one side thereof, and a pair of scraper-blades clamped on the scraper-body at its lower edge, said scraper-blades being adapted to rotate and bear upon a filtering-block for removing sediment therefrom.

4. In a filter of the character described, the combination with a filtering-block held in a casing, of a shaft passing loosely through the filtering-block, and a scraper device comprising a laterally-flanged plate-metal body having perforations in the flanges for loosely receiving the shaft, and scraper-blades on the lower edge of the scraper-body, adapted for engaging the top of the filtering-block.

In testimony whereof I have signed my name to this specification in the presence of two subscribing witnesses.

WILLIAM R. POWELL.

Witnesses:
A. W. SMITH,
H. C. PETERMANN.